Oct. 19, 1965  L. KATZ ET AL  3,212,325

FORCE MEASURING INSTRUMENT

Filed July 30, 1963

LESTER KATZ,
JACK J. NICHOLS,
INVENTORS.

BY
Wayland H. Riggins
ATTORNEYS 3,212,325
FORCE MEASURING INSTRUMENT
Lester Katz and Jack J. Nichols, Huntsville, Ala., assignors to the United States of America as represented by the Administrator of the National Aeronautics and Space Administration
Filed July 30, 1963, Ser. No. 298,800
3 Claims. (Cl. 73—88.5)
(Granted under Title 35, U.S. Code (1952), sec. 266)

The invention described herein may be manufactured and used by or for the Government of the United States of America for governmental purposes without the payment of any royalties thereon or therefor.

This invention relates generally to devices for measuring forces in structural elements, and more particularly to an instrument for sensing strain and indicating load or stress in a fastening member such as a bolt or stud.

It is of great concern in structural work to avoid excessive loading of structural members and particularly of the numerous fastening members such as bolts and studs which are employed in component assembly. Failure of a single bolt may result in disaster. This is particularly true in the construction of missiles and space vehicles.

To assure that design loads are not exceeded it is often desirable or necessary when installing fastening members during the assembly of structural components to determine the magnitude of the forces such as load or stress to which the fastening members are subjected. A commonly used method to determine the load in a bolt is to first develop a "Torque versus Curve" by testing a series of bolts. Then, upon installation of the bolts, the amount of torque proportional to the desired load is applied to the bolt by means of a torque wrench. This method, while satisfactory where only a rough knowledge of the bolt load is desired, fails for conditions of critical load because laboratory experience has shown that the actual load in bolts having the same amount of torque applied thereto can vary by more than 100%.

Another method currently used ot determine the amount of stress or load within a fastening member is based on the deformation of a washer under the head of the bolt. This method suffers from a number of drawbacks, however. The bolt head must invariably bear harder on one area of the washer than another due to the nonparallelism of the mating surfaces. Thus, there is a tendency for nonlinearity of operation between laboratory calibrations and field applications. Secondly, these devices may be subject to errors in the indicated load due to temperature differences between calibration environment and use environment. Thirdly, these washers are expensive and must necessarily be expendable since they remain under one particular bolt and cannot be used on another. Fourthly, these washers cannot be used where torque is applied to the head end of bolts because relative motion galls the washer and causes faulty operation.

Other devices known in the art involve disposition of apparatus within a longitudinal bore formed in the fastening member to sense changes in length of the fastening member when subjected to tension. These known devices, however, are found to be unsatisfactory with respect to one or more of the following considerations:

(1) Reusability
(2) Installation access
(3) Accuracy
(4) Economical production
(5) Compactness
(6) Simplicity The present invention provides a means for measuring forces in structural members which overcomes or mitigates the disadvantages of existing devices. A reusable, compact and highly accurate instrument is provided which is economical to produce and can be installed with minimum access area. These features and improvements will become apparent as the description proceeds.

The invention comprises a reciprocating plunger carried by a frame member. The frame member is adapted to be installed on a strain-subject member with one end of the plunger positioned in engagement with the closed end of a blind hole formed in the strain-subject member. The other end of the plunger engages a spring-like strip which is supported by the frame member. This strip is deformable in response to reciprocation of the plunger and is operatively connected to a strain sensing element. When strain occurs within the strain-subject member the plunger will move a distance equal to the amount of strain, resulting in a proportionate deformation of the spring-like strip. This deformation is sensed by the strain sensing element which in turn activates an indicator which may be calibrated to provide the desired reading such as load, strain or torque in the strain-subject member.

In describing the invention in detail reference will be made to the accompanying drawings in which.

Figure 1:
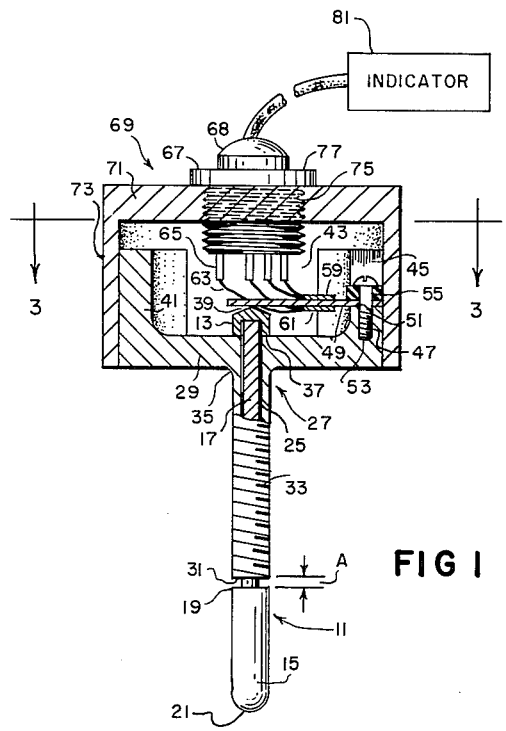
FIGURE 1 is an elevational view, partly in section, of a force measuring instrument.
Figure 2:
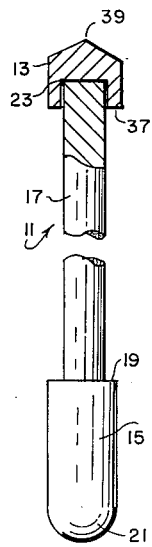
FIGURE 2 is an elevational view, partly in section, of a plunger which is an operative part of the force measuring instrument.

Referring now to FIGURE 1, which shows the instrument assembly, 11 is a reciprocating plunger which constitutes one of the principal components of the instrument. As shown in detail in FIGURE 2, the plunger 11 has a cap 13, a foot portion 15 and a shank portion 17 which extends between the cap and the foot portion. The diameter of the foot portion 15 exceeds the diameter of the shank portion 17 providing a shoulder 19. The foot portion 15 terminates in a spherical configuration 21. The cap 13 has a blind hole 23 therein permitting it to be fitted over the end of the shank portion 17.

As illustrated in FIGURE 1, the shank portion 17 of the plunger 11 is slidably disposed within an aperture 25 formed in a frame member 27. In the illustrated embodiment the frame member 27 consists of a head plate 29 joined at 35 to a sleeve portion 33. The head plate 29 forms one end of the frame member 27 and the other end of the frame member is the free end 31 of the sleeve portion 33. While the sleeve portion 33 is illustrated as being integral with the head plate 29, it is evident that these elements may be separably connected if desired. The shank portion 17 of the plunger 11 extends through the sleeve portion 33 and the head plate 29. The cap 13 may be shrink fitted on the end of the shank portion 17 after the shank portion is pushed through the aperture 25. The diameter of the main body of the cap 13 exceeds the diameter of the aperture 25. This provides a shoulder 37 which abuts the surface of the head plate 29 preventing withdrawal of the plunger 11 from the aperture 25. The end of the cap opposite the shoulder 37 tapers to a point 39.

The maximum amount of plunger reciprocation permitted is indicated by the distance "A" between the end 31 of the sleeve portion 33 and the shoulder 19 of the foot portion 15. The advantages of limiting the reciprocation in this manner will be discussed hereinafter.

Extending from the end of the frame member 27 which bears the head plate 29 may be a sidewall 41. This sidewall surrounds the plunger cap 13 except for a segment which is omitted at 43 for reasons which will appear later. A notch 45, having a threaded blind hole 47 drilled in the bottom thereof, is also formed in the sidewall 41.

Seated on the bottom surface of the notch 45 is an end portion of a spring-like strip 49. This strip is preferably made of spring steel. An aperture 51 in the strip is in register with the blind hole 47. A screw 53 provided with a washer 55 passes through the aperture 51 in the metal strip 49 and is tightened in the blind hole 47.

The strip 49, being anchored at one end in the notch 45, projects inwardly so that its free end portion overlies the point 39 of the plunger cap 13. Thus, when the shoulder 37 of the plunger cap 13 abuts the surface of the head plate 29 the pointed end 39 of the cap 13 contacts in slidable relation the metal strip 49.

Mounted on opposite surfaces of the metal strip 49 are strain sensing elements 59 and 61. These sensing element may be of the type which include conductive wires of minute diameter which are designed to follow the surface strain of the member to which they are attached, resulting in a change in tension within the wires. This change in tension produces a change in electrical resistance of the wires which is proportional to the strain in the member. Sensing elements of this general type are well known in the art of strain gauges.

Conducting wires 63 extend from the sensing elements 59 and 61 to terminals 65 of a connector plug 67. In order to provide a housing for the strain sensing elements and the metal strip 49 a cover 69 is provided. This cover 69 includes an end plate 71 and a sidewall 73 which engages the sidewall 41 in telescopic relationship. The end plate 71 of the cover 69 is provided with a threaded hole 75 therethrough to receive the connector plug 67. The connector plug 67 is appropriately threaded so that it may be screwed into the hole 75.

Figures 3, 4:
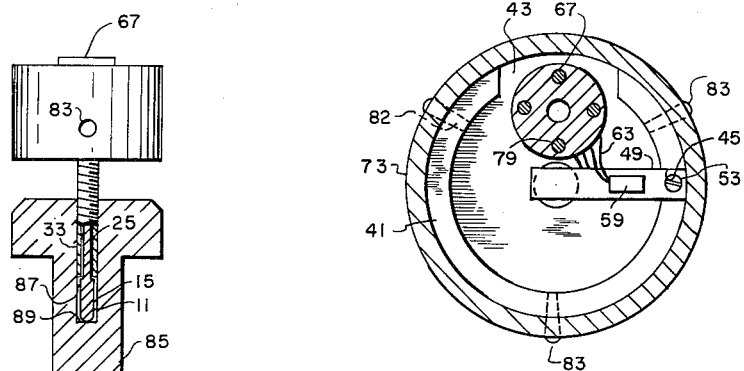
FIGURE 3 is a cross-sectional view taken along line 3—3 of FIGURE 1.
FIGURE 4 is an elevational view, partly in section, of the force measuring instrument installed on a bolt.

The connector plug 67 has a head 77 which is greater in diameter than the hole 75. This provides a flange which bears against the outer surface of the end plate 71 around the hole 75 when the connector plug is screwed tightly into the hole 75. As shown in FIGURE 3, sockets 79 are formed in the connector plug 67 for receiving the plug 68 of an indicator 81. The indicator 81 may conveniently include the power source for the instrument. The telescoping sidewalls 41 and 73 are provided with circumferentially spaced apertures 82 which register to receive locking pins 83.

The omission at 43 of a segment of the sidewall 41 provides a space for a portion of the connector plug 67 to occupy when it is screwed into the hole 75. This arrangement adds to the compactness of the instrument.

For the purposes of illustration, the cover 69, sidewall 41 and the head plate 29 are shown as being circular. It is understood, however, that these and other parts of the instrument may be circular, rectangular or any other configuration as desired.

A mode of operation of the invention will be described with reference to FIGURE 4. Therein is shown a strain-subject structural member in the form of a bolt 85 which in use will normally be subjected to tensile stress. The bolt 85 is provided with an axial blind hole 87. This hole extends partially through the length of the bolt 85 and receives the sleeve 33 of the frame member 27 which carries the reciprocating plunger 11. The hole 87 is threaded from its open end inwardly leaving the portion near its closed end 89 untapped, if desired, for a distance equal to, or less than, the length of the foot portion 15 of the plunger 11.

The instrument is applied to the bolt by screwing the sleeve 33 into the hole 87 a sufficient distance to cause the spherical end 21 of the plunger 11 to engage the closed end 89 of the hole 87 and force the plunger to retract. If desired, the plunger may be retracted until the shoulder 19 of the foot portion 15 abuts the end 31 of the sleeve portion 33. An indication that this abutment has occurred will be the tightening of the threaded engagement of the sleeve 33 within the hole 87. Indication of retraction of the plunger may also be given by the indicator 81.

Retraction of the plunger 11 forces displacement of the free end of the metal strip 49. At this stage, with the plunger retracted, the metal strip 49 is spring-urging the plunger against the closed end 89 of the hole 87. The indicator 81 may then be set at zero.

The advantages of the limited retraciton of the plunger, which is represented by the distance "A" in FIGURE 1, can now be appreciated. By virtue of this limited retraction the plunger is prevented from possibly bending the metal strip 49 beyond its elastic limit and deforming it permanently. Also, the abutment of the shoulder 19 of the foot portion 15 against the end 31 of the sleeve 33 provides a means of tightening the threaded engagement of the sleeve within the bolt 85 at the same time the plunger reaches its maximum retraction.

When torque is applied to the bolt the resulting tension will cause the bolt to stretch and become slightly longer. As the bolt elongates, the distance within the hole 87 between its closed end 89 and the end 31 of the sleeve portion 33 will increase. The amount of this increase will be the distance the plunger 11 will move outwardly under the spring-urging of the metal strip 49. As the plunger 11 moves outwardly, the metal strip 49 returns toward its normal undeformed position. This change in the amount of deformation in the metal strip is sensed by the strain sensing elements 59 and 61 and read on the indicator 81 which is plugged into the connector plug 67. The change in the amount of deformation in the metal strip 49 is proportional to the distance the plunger 11 moves outwardly, which in turn is proportional to the amount of tensile load in the bolt 85. These proportions may be determined for a standard bolt having a standard blind hole therein by subjecting several specimens to known tensile loads while taking readings with the instrument. If desired, the indicator 81 may be calibrated to provide a direct reading of the torque within the bolt.

When the bolt has been subjected to the desired tensile load the instrument may be removed therefrom and made available for use on another bolt or other structural member.

From the foregoing, it is apparent that the invention provides a highly accurate force measuring instrument which is reusable and economical to produce. Due to its compactness and ease of installation, the instrument can be employed in conditions of minimum access.

Obviously numerous modifications and variations of the present invention are possible in the light of the above teachings. It is, therefore, to be understood that within the scope of the appended claims the invention may be practiced otherwise than as specifically described therein.

What is claimed is:

1. In an instrument for measuring forces in a strain-subject structural member:
   (a) a frame member having an aperture therethrough;
   (b) a plunger comprising a shank portion extending between a cap and a foot portion;
   (c) said shank portion of said plunger being slidably disposed in said aperture and exceeding said aperture in length by a predetermined distance;
   (d) said cap and said foot portion each having a greater diameter than said shank portion and said aperture thereby preventing withdrawal of said shank portion from said aperture and limiting the reciprocation of said plunger to said predetermined distance;
   (e) means supporting a spring-like metal strip adjacent said frame member;
   (f) said strip being in contact with said cap of said plunger;

(g) said foot portion of said plunger engaging said structural member so as to transmit said forces to said plunger;

(h) strain sensing means operatively connected to said strip.

2. An instrument for measuring forces in a structural member having a blind hole therein, said instrument comprising:

(a) a frame member having first and second ends;

(b) said frame member terminating in a sleeve portion the end of which forms said first end of said frame member;

(c) said sleeve portion being adapted for entering said blind hole in said structural member;

(d) said frame member having an aperture therethrough extending from said first end to said second end;

(e) a plunger comprising a shank portion extending between a cap and a foot portion;

(f) said shank portion of said plunger being slidably disposed in said aperture and exceeding the aperture in length by a predetermined distance;

(g) said cap and said foot portion each having a greater diameter than said shank portion and said aperture hereby preventing withdrawal of said shank portion from said aperture and limiting the reciprocation of said plunger to said predetermined distance;

(h) said cap tapering to a point at one end of said plunger;

(i) a metal strip having one end thereof anchored to said frame member adjacent said second end of said frame member;

(j) said metal strip adjacent its other end being in contact with said pointed end of said plunger whereby deformation of said metal strip will change in response to reciprocation of said plunger;

(k) a strain sensing element attached to said metal strip intermediate said anchored end and said contact point.

3. An instrument for measuring forces in a structural member having a blind hole therein, said instrument comprising:

(a) a frame member having first and second ends;

(b) said frame member terminating in a sleeve portion the end of which forms said first end of said frame member;

(c) said sleeve portion being adapted for entering said blind hole in said structural member;

(d) said frame member having an aperture therethrough extending from said first end to said second end;

(e) a plunger comprising a shank portion extending between a cap and a foot portion;

(f) said shank portion of said plunger being slidably disposed in said aperture and exceeding the aperture in length by a predetermined distance;

(g) said cap and said foot portion each having a greater diameter than said shank portion and said aperture thereby preventing withdrawal of said shank portion from said aperture and limiting the reciprocation of said plunger to said predetermined distance;

(h) said cap tapering to a point at one end of said plunger;

(i) a metal strip having one end thereof anchored to said frame member adjacent said second end of said frame member;

(j) said metal strip adjacent its other end being in slidable contact with said pointed end of said plunger whereby deformation of said metal strip will change in response to recipocation of said plunger;

(k) a strain sensing element attached to said metal strip intermediate said anchored end and said contact point;

(l) a cover comprising an end plate carrying a connector plug;

(m) said cover engaging said frame member with said end plate overlying and spaced from said second end of said frame member thereby forming a housing for said metal strip and said sensing element;

(n) said sensing element being operatively connected to said connector plug.

References Cited by the Examiner

UNITED STATES PATENTS

| | | | |
|---|---|---|---|
| 2,503,141 | 4/50 | Stone | 73—141 X |
| 2,761,216 | 9/56 | Gollub | 73—141 X |
| 2,995,033 | 8/61 | Stifano | 73—141 |
| 3,036,283 | 5/62 | Singdale et al. | |

RICHARD C. QUEISSER, *Primary Examiner.*